United States Patent
Sesay et al.

(10) Patent No.: US 6,454,963 B1
(45) Date of Patent: Sep. 24, 2002

(54) ELIXIR FOR REMOVING METALS FROM WASTEWATER

(75) Inventors: Sahid Sesay, Alameda; Edison Mbayo, San Jose, both of CA (US)

(73) Assignee: Baffin, Inc., Alameda, CA (US)

( * ) Notice: Subject to any disclaimer, the term of this patent is extended or adjusted under 35 U.S.C. 154(b) by 21 days.

(21) Appl. No.: 09/664,865

(22) Filed: Sep. 19, 2000

(51) Int. Cl.7 .................................................. C02F 1/62
(52) U.S. Cl. ...................... 252/181; 210/716; 210/721; 210/728; 210/912; 252/180
(58) Field of Search ................................ 210/721, 725, 210/726, 727, 728, 732, 733, 734, 735, 736, 754, 756, 716, 912; 252/175, 180, 181

(56) References Cited

U.S. PATENT DOCUMENTS

| | | | | |
|---|---|---|---|---|
| 3,960,584 A | * | 6/1976 | Savage | 106/178 |
| 4,415,467 A | * | 11/1983 | Piepho | 252/181 |
| 5,614,102 A | * | 3/1997 | Sakurada | 210/718 |
| 5,643,456 A | * | 7/1997 | Smith et al. | 210/651 |
| 5,753,125 A | * | 5/1998 | Kreisler | 210/710 |
| 6,171,506 B1 | * | 1/2001 | Allen et al. | 210/728 |

* cited by examiner

*Primary Examiner*—Peter A. Hruskoci
(74) *Attorney, Agent, or Firm*—Lyon & Lyon LLP

(57) ABSTRACT

An elixir for treating wastewater by transforming metal sulfates into metal hydroxides, breaking up chelated metals and transforming the freed metal ions into metal hydroxides, and precluding the metal hydroxides from dissolving back into solution. The elixir comprises: 1) calcium hydroxide, 2) METEX EPS, 3) sodium dimethyl dithiocarbamate, 4) calcium hypochlorite, 5) sodium hydroxide, 6) a combination of calcium salts and a first polymeric coagulant, 7) a second polymeric coagulant, and 8) water.

14 Claims, No Drawings

ELIXIR FOR REMOVING METALS FROM WASTEWATER

FIELD OF THE INVENTION

This invention pertains to the field of removing contaminants from a liquid, including, more specifically, removing heavy metals from industrial wastewater.

BACKGROUND OF THE INVENTION

Many industrial processes produce wastewater streams that are laden with contaminants. These industrial processes include, among others, electroplating, galvanizing, anodizing, chelating, metal finishing, printed circuit board (PCB) manufacturing, semiconductor, magnetic disk manufacturing, mining operations, photo processing, fungicide manufacturing, food preparation, paper and pulp, textile, and oil refining. The wastewater streams of these different processes may contain any number of contaminants, including heavy metals, organic wastes, and inorganic wastes. In regard to heavy metal contaminants, they generally include, but are not limited to, metals such as copper, iron, gold, lead, nickel, silver, tin, zinc, chromium, cadmium, and arsenic.

The presence of these metals in wastewater causes the wastewater to be highly toxic. They can make the wastewater corrosive, inflammable, and even explosive. Due to the toxicity of metal laden wastewater, it poses a real danger of damaging wastewater collection systems, such as publicly owned treatment works (POTW), and of harming the environment.

In order to address the risks that metal laden wastewater presents, strict regulations have been imposed on plants regarding their wastewater discharges. Various agencies currently set maximum limits on the quantity of metals that plants may discharge into their waste streams. Where a plant discharges its wastewater to a POTW, these maximum limits are set either by the POTW itself, or by a municipal agency. And where a plant is discharging its wastewater directly to the environment, the maximum limits are typically set by state regulatory agencies and/or the Environmental Protection Agency.

Because of this need to minimize the quantity of metals discharged, plants treat their wastewater streams to remove the majority of the metals present. Since each metal has an optimum pH at which it will precipitate out of wastewater, plants have conventionally removed these metals individually using hydroxide precipitation over a series of pH adjustments, or by segregating waste streams that contain different metals and treating them individually. At each pH adjustment, at least one metal present in the wastewater will react with the treatment chemicals that have been added and will precipitate out of the wastewater. The metal precipitates must also be given a sufficient amount of time to settle out. The wastewater is then moved to another tank for the next pH adjustment. The wastewater must be moved to a new tank because once the pH level is changed, the metal that was just removed will have a tendency to re-dissolve back into solution.

For example, metals such as iron precipitate out of solution at lower pH levels, while metals such as nickel and cadmium precipitate out at higher pH levels. At a lower pH level, iron will precipitate out of solution, but if the pH level is then increased in order to remove other metals, the iron will dissolve back into solution. To solve this problem the wastewater is typically moved to a new treatment tank after a pH adjustment, leaving behind the metal that just precipitated out.

One drawback of known treatment processes is the length of time the precipitation of metals normally takes. Known methods chemically treat each metal separately, which requires many pH adjustments. In addition, the use of existing coagulants in known systems causes the metals to settle out slowly. Furthermore, known systems typically require a final pH adjustment prior to discharge. Thus the end result of all of these potential bottlenecks is that the entire operation may take anywhere from several hours to several days to complete.

Another drawback of known treatment systems is that when a plant generates several waste streams that each contain different metals, the waste streams are treated separately due to the problems involved in treating wastewater with multiple metals. This either forces a plant to implement more than one wastewater treatment system, or forces a plant to treat its waste streams one at a time. These limited options cause the plant to incur additional time and expense to treat all of its wastewater.

The fact that these processes can also be labor-intensive adds another source of time consumption. For example, plant operators often have to manually determine pH levels and manually add acid or base to adjust the pH levels, especially when spikes in metal concentrations occur. In addition, the chemicals that are added to the wastewater to precipitate out the metals can be in either solid or liquid form. This makes the addition of these chemicals into treatment tanks a more time-consuming process because operators typically add the solid chemicals manually, or have to initially mix the solid chemicals into clean water prior to adding it into the wastewater.

Another drawback to known systems is the fact that a plant's treatment process normally has to be-tailored to the specific composition of that individual plant's wastewater so that it effectively removes the metals present. Generally, plants cannot simply implement an "off-the-shelf" process for treating their wastewater. Instead, plants typically-have to design a treatment process around their effluent streams. This means that in the event of a system upset, for example higher levels of a metal or the introduction of a new metal in the wastewater, the treatment process will typically be less effective or ineffective altogether. The unfortunate result of this may be an unlawful discharge of metals. Thus, plants must continuously monitor the composition of their wastewater streams and modify the treatment processes and the chemicals they use to effectively treat their wastewater.

Other drawbacks of known systems relate to flocculation and coagulation when known flocculants and coagulants are mixed into the wastewater. Coagulation is the process of combining the suspended metal solids, typically in the form of colloids or flocs, into larger and heavier particles. These larger particles become too heavy to remain suspended in the wastewater and drop to the bottom of the solution. A slightly different process that has similar results is flocculation, which is the process of physically trapping and/or linking the flocs together, typically through the use of a polymer. In known systems, one drawback is that most polymers are supplied in powder form, requiring the users to mix the powder into water prior to adding it into the wastewater. This is labor-intensive and time consuming process. Another drawback is that when flocculants are mixed into the wastewater, their flocculation effects are retarded by the mixing blades which tend to break-up the flocs that form. This results in sludge which is difficult to remove from the wastewater and from filters. In addition, the difficulty of removing sludge from filters is exacerbated by the fact that often, due to the use of high quantities of lime, the sludge is slimy and clings to filters, resulting in a high filter replacement rate.

Accordingly, there is a need for a process to remove metals from wastewater that is less time consuming and does not need to be specifically tailored for the wastewater composition of each plant in which it is used, and that also addresses the other drawbacks of known systems that were mentioned above.

SUMMARY OF THE INVENTION

The present invention is a liquid chemical formulation that addresses some of these aforementioned problems. Specifically, the elixir of the present invention removes metals from wastewater and comprises: 1) calcium hydroxide, 2) METEX EPS, 3) sodium dimethyl dithiocarbamate, 4) calcium hypochlorite, 5) sodium hydroxide, 6) a blend of calcium salts and a first polymeric coagulant, 7) a second polymeric coagulant, and 8) water.

DETAILED DESCRIPTION OF THE INVENTION

The elixir of the present invention causes a number of different chemical reactions to occur in wastewater that ultimately result in the removal of metals. The elixir transforms metal sulfates into metal hydroxides that are insoluble in water, breaks up chelated metals, and transforms the metal ions freed from the chelates into insoluble metal hydroxides. The elixir then bonds to these metal hydroxides to preclude them from dissolving back into the wastewater solution.

It is important to note that other reactions in the wastewater may also occur due to the elixir of the present invention, and the reactions outlined herein should be construed as exemplary and not as being the only reactions that occur. In addition, although this specification addresses the removal of metals from wastewater, the elixir of the present invention may also be used to remove other contaminants, including organic and inorganic contaminants. Finally, the elixir of the present invention is preferably used in conjunction with the system disclosed in co-pending U.S. Patent Application entitled "HIGHLY ACCELERATED PROCESS FOR REMOVING CONTAMINANTS FROM LIQUIDS", Lyon & Lyon docket number 247/251.

This elixir of the present invention comprises a mixture of several different compounds added to a relatively large volume of water. The first compound is preferably calcium hydroxide, also known as lime. It is available from a variety of sources, such as CalMat Co. of Colton, Calif. The presently preferred calcium hydroxide used in the present invention is Type S Dolomitic Hydrated Lime, also known as builder's lime, which comprises calcium hydroxide blended with other chemicals including magnesium hydroxide, calcium carbonate, magnesium oxide, and silicon dioxide. Type S Dolomitic Hydrated Lime is available from Chemical Lime Company of Fort Worth, Tex.

When added to metal laden wastewater, the calcium hydroxide tends to react with metal sulfates and converts them into metal hydroxides. These metal hydroxides are insoluble in the wastewater and therefore precipitate out of solution. The calcium hydroxide also tends to alter the pH of the wastewater, although it is typically not very effective at this because of the competing effect from the insoluble sulfates that it typically causes to form. An exemplary chemical reaction where calcium hydroxide reacts with two metal sulfates to form hydroxide precipitates is shown here:

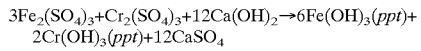

A second compound in the elixir is preferably the commercially available compound METEX EPS, produced by MacDermid Incorporated of Waterbury, Connecticut. The METEX EPS is a mild alkaline material that typically aids in the precipitation of heavy metals and that comprises dimethylamine, and which has a pH of 12, a specific gravity of 1.176, and a freezing point of zero degrees Celsius.

A third compound in the elixir is preferably sodium dimethyl dithiocarbamate. In the presently preferred embodiment this third compound comprises a 40% aqueous solution of sodium dimethyl dithiocarbamate, available under the trade name METAL GRABBER from Great Western Chemical Co. of Portland, Oreg., which has a specific gravity of 1.18, a pH of between 11.3 and 12.3 as is, a pH of between 7 and 8 for a one percent solution, and a density of 9.854 lbs/gallon. This compound tends to serve as another heavy metal precipitant in the process.

The fourth compound in the elixir is preferably calcium hypochlorite. It is presently preferred that this fourth compound comprises the commercially available compound INDUCOLOR CALCIUM HYPOCHLORITE GRANULES, produced by PPG Industries, Inc. of Pittsburgh, Pa., which decomposes at about 180 degrees Celsius and has a density of 65–67 pounds per cubic foot. INDUCOLOR is comprised of calcium hypochlorite blended with some inert ingredients. This compound as an oxidizing agent tends to destroy cyanide present in the wastewater, and it tends to remove dyes and pigments from the wastewater.

The fifth compound in the elixir is preferably sodium hydroxide, also known as caustic soda. More preferably, a 50% aqueous solution of sodium hydroxide is used. This is a common chemical available from a variety of sources, such as Great Western Chemical Co. of Portland, Oreg.

The sodium hydroxide tends to react with metal sulfates in the wastewater to form insoluble metal hydroxides. The sodium hydroxide also raises the pH level of the wastewater up to approximately the pH 9.0 to pH 9.8 range. This rise in pH level tends to break up some of the chelated metals. The. metals ions that are created when the chelated metals are broken up then tend to react with the sodium hydroxide and the calcium hydroxide present in the elixir to form insoluble metal hydroxides. An exemplary chemical reaction where sodium hydroxide reacts with a metal sulfate to form a hydroxide precipitate is shown here:

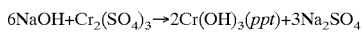

The sixth and seventh compounds used in the elixir are preferably polymeric coagulants. The sixth compound preferably also comprises a calcium salt (such as calcium chloride), and the seventh compound preferably also comprises organic precipitants. In a preferred embodiment, these polymeric coagulants specifically comprise the commercially available COAGULITE 300 (which contains the calcium salt at less than 40% by weight), which has a boiling point of 104.44 degrees Celsius, a specific gravity of 1.325, a solubility in in water of 100, and a vapor pressure of 17.5 at 20 degrees Celsius, and COAGULITE EMR (which contains the organic precipitants), which has a specific gravity of 1.18, a boiling of 101.66 degrees Celsius, a solubility in water of 100, and a vapor pressure of 17.5 at 20 degrees Celsius. These are both produced by DuBois Chemicals of Cincinnati, Ohio.

These polymeric coagulants tend to bond to the precipitated metals and preclude them from dissolving back into the solution once they have precipitated out. The polymeric coagulants act to ensure that once the precipitated metals are removed from the wastewater, they are in general coagulated into larger particles that stay out of the wastewater and do not dissolve back into solution if the pH level of the wastewater changes.

The elixir of the present invention is preferably produced by a batch process. The following is a preferred description of the method for manufacturing a forty-five gallon batch of the elixir. The quantities given may be scaled up or down depending on the needs of a user.

The manufacturing process preferably takes place in a forty-five gallon (204.57 liter) mixing tank with mechanical mixers. The first step is to half fill the mixing tank with warm water. Next, the mixers are turned on at a slow rate.

The first ingredient, calcium hydroxide in the form of Type S Dolomitic Hydrated Lime ($Ca(OH)_2Mg(OH)_2$), is then mixed into the water. Preferably approximately fifteen pounds (15 lbs.), or 6.795 kg, of calcium hydroxide is added. After all of the calcium hydroxide has been added, the resulting solution is preferably allowed to continue mixing until the calcium hydroxide is completely dispersed into the water.

The second ingredient, METEX EPS, is then added while continuing to run the mixer. Preferably, approximately 0.341 liters of METEX EPS is added. Once the METEX EPS has been added, the resulting solution is preferably allowed to continue mixing until the METEX EPS has completely dispersed. After this mixing period, the speed of the mixer is preferably reduced.

The third ingredient, a forty-percent aqueous solution of sodium dimethyl dithiocarbamate (e.g. METAL GRABBER), is added next. Preferably, approximately 1.023 liters of this ingredient is added. Once it has been added, the resulting solution is mixed until the ingredient is dispersed.

The fourth ingredient, calcium hypochlorite ($Ca(ClO_2)_2$) in the form of INDUCOLOR, is then added to the solution. Preferably, approximately twenty-four fluid ounces (24 oz.) of this fourth ingredient is added.

Because the calcium hypochlorite has a strong odor, it is safer to dilute the calcium hypochlorite in water before adding it the mixing tank. This should be done in a ventilated area preferably by pouring twelve ounces of the calcium hypochlorite at a time into a gallon container and topping it off with water. The calcium hypochlorite solution in the gallon container should be mixed thoroughly before it is added to the treatment tank.

Once the calcium hypochlorite has been added to the solution, the resulting solution is mixed until the calcium hypochlorite is dispersed. After this mixing period, the speed of the mixer is preferably reduced.

The fifth ingredient, a 50% solution of sodium hydroxide, is preferably added to the solution next. Preferably, approximately one U.S. gallon, or 3.785 liters, of the sodium hydroxide is added. After this ingredient has been added, the resulting solution is mixed until the sodium hydroxide is dispersed.

The sixth ingredient, COAGULITE 300, is preferably added next. Preferably, approximately 0.341 liters, is added. The resulting solution is then allowed to continue mixing until the COAGULITE 300 is completely dispersed.

The seventh ingredient, COAGULITE EMR, is preferably added next. Preferably, approximately 0.341 liters of the COAGULITE EMR is used. It is preferred that the speed of the mixer be reduced at this point.

Finally, water is preferably added to bring the volume of the solution to forty-five gallons, or 204.57 liters. Upon completion of this process, generally one liter of the elixir of the present invention will comprise approximately 39.84 g of calcium hydroxide, approximately 2.00 ml of METEX EPS, approximately 6.00 ml of the forty-percent aqueous solution of sodium dimethyl dithiocarbamate, approximately 3.86 g of calcium hypochlorite, approximately 26.66 ml of 50% sodium hydroxide, approximately 2.00 ml of COAGULITE 300, and approximately 2.00 ml of COAGULITE EMR. Preferably, the ratio of calcium hydroxide: METEX EPS: sodium dimethyl dithiocarbamate: calcium hypochlorite: sodium hydroxide: COAGULITE 300: COAGULITE EMR should be approximately 15 to 25 grams: 0.01 to 2 ml: 1.5 to 4.5 ml: 1 to 3 grams: 10 to 16 ml: 0.01 to 2.0 ml: 0.01 to 2.0 ml.

It will be appreciated by those of ordinary skill in the art of wastewater treatment that elixirs prepared simply by substituting solutions that are chemically similar to METEX EPS, METAL GRABBER, INDUCOLOR, COAGULITE 300, and COAGULITE EMR, as well as any other chemicals mentioned herein, will still be encompassed within the scope of the claims. Accordingly, the above description should be construed as illustrative, and not in a limiting sense, the scope of the invention being defined by the following claims.

What is claimed:

1. An elixir for treating wastewater, consisting essentially of:
   a mixture of water calcium hydroxide;
   sodium dimethyl dithiocarbamate;
   calcium hypochlorite;
   sodium hydroxide;
   an alkaline material comprising dimethylamine that assists in precipitating metals;
   a combination of a calcium salt and a first polymeric coagulant; and
   a second polymeric coagulant.

2. The elixir of claim 1, wherein the calcium hydroxide is in the form of $Ca(OH)_2Mg(OH)_2$.

3. The elixir of claim 1, wherein 15 to 25 grams of the calcium hydroxide is used for every 1 millimeter of the second polymeric coagulant that is used.

4. The elixir of claim 1, wherein the sodium dimethyl dithiocarbamate is in the form of a 40% aqueous solution.

5. The elixir of claim 1, wherein 1.5 to 4.5 milliliters of the sodium dimethyl dithiocarbamate is used for every 1 millimeter of the second polymeric coagulant that is used.

6. The elixir of claim 1, wherein the calcium hypochlorite consists of calcium hypochlorite blended with an inert substance.

7. The elixir of claim 1, wherein 1.0 to 3.0 grams of the calcium hypochlorite is used for every 1 millimeter of the second polymeric coagulant that is used.

8. The elixir of claim 1, wherein the sodium hydroxide is in the form of a 50% aqueous solution.

9. The elixir of claim 1, wherein 10.0 to 16.0 milliliters of the sodium hydroxide is used for every 1 millimeter of the second polymeric coagulant that is used.

10. The elixir of claim 1, wherein 0.01 to 2.0 milliliters of the alkaline material is used for every 1 millimeter of the second polymeric coagulant that is used.

11. The elixir of claim 1, wherein the combination of the calcium salt and the first polymeric coagulant comprises a solution consisting of a calcium salt and a polymeric coagulant.

12. The elixir of claim 1, wherein 0.01 to 2.0 milliliters of the combination of the calcium salts and the first polymeric coagulant is used for every 1 millimeter of the second polymeric coagulant that is used.

13. The elixir of claim 1, wherein the second polymeric coagulant comprises a polymeric coagulant in solution with organic precipitants.

14. A method of manufacturing the elixir of claim 1, comprising:

adding water to a mixing tank;

mixing the calcium hydroxide into the water;

mixing the alkaline material that assists in precipitating metals into the water;

mixing a 40% aqueous solution of the sodium dimethyl dithiocarbamate into the water;

mixing the calcium hypochlorite into the water;

mixing a 50% solution of the sodium hydroxide into the water;

mixing the combination of a calcium salt and the first polymeric coagulant into the water; and mixing the second polymeric coagulant into the water.

* * * * *